United States Patent
Kim

(10) Patent No.: US 10,845,264 B2
(45) Date of Patent: Nov. 24, 2020

(54) PRESSURE SENSOR AND MANUFACTURING METHOD THEREFOR

(71) Applicant: Tyco Electronics AMP Korea Co. Ltd, Gyungsangbuk-do (KR)

(72) Inventor: Young Deok Kim, Gyeungsangbuk-do (KR)

(73) Assignee: Tyco Electronics AMP Korea Co., Ltd., Gyeongsangbuk-Do (KR)

( * ) Notice: Subject to any disclaimer, the term of this patent is extended or adjusted under 35 U.S.C. 154(b) by 192 days.

(21) Appl. No.: 16/020,343

(22) Filed: Jun. 27, 2018

(65) Prior Publication Data

US 2018/0306664 A1    Oct. 25, 2018

Related U.S. Application Data

(63) Continuation of application No. PCT/KR2016/015353, filed on Dec. 28, 2016.

(30) Foreign Application Priority Data

Dec. 29, 2015    (KR) ...................... 10-2015-01888662

(51) Int. Cl.
  *G01L 19/06* (2006.01)
  *G01L 19/14* (2006.01)
  *G01L 9/00* (2006.01)

(52) U.S. Cl.
  CPC ............ *G01L 19/06* (2013.01); *G01L 9/0051* (2013.01); *G01L 19/144* (2013.01); *G01L 19/147* (2013.01)

(58) Field of Classification Search
  CPC ...... G01L 19/06; G01L 19/144; G01L 19/147; G01L 9/0051
  See application file for complete search history.

(56) References Cited

U.S. PATENT DOCUMENTS

4,670,730 A    6/1987  Takeda et al.
5,822,173 A *  10/1998 Dague ................. G01L 9/0075
                                               361/283.3
(Continued)

FOREIGN PATENT DOCUMENTS

CN       1806164 A     7/2006
CN     203616040 U     5/2014
(Continued)

OTHER PUBLICATIONS

Chinese First Office Action with English translation, Chinese Patent Application No. 2016800772822, dated Oct. 16, 2019, 20 pages.

(Continued)

*Primary Examiner* — Francis C Gray
(74) *Attorney, Agent, or Firm* — Barley Snyder

(57) ABSTRACT

A pressure sensor comprises a sensor housing and a sensor header. The sensor housing includes a fastener adapted to be fastened to a pressure measurement target and a housing pathway extending through the fastener and adapted to guide a fluid flowing from the pressure measurement target. The sensor header includes a port pressed in and fixed to the housing pathway, a header pathway extending through the port and adapted to guide the fluid flowing from the housing pathway, and a diaphragm positioned at an end portion of the header pathway.

13 Claims, 6 Drawing Sheets

(56) References Cited

U.S. PATENT DOCUMENTS

| | | | | |
|---|---|---|---|---|
| 6,457,368 | B1* | 10/2002 | Sasaki | G01L 19/0084 |
| | | | | 73/753 |
| 8,915,130 | B1* | 12/2014 | Huang | G01L 17/00 |
| | | | | 73/146.3 |
| 2001/0023616 | A1* | 9/2001 | Wade | F02M 63/0225 |
| | | | | 73/756 |
| 2005/0097721 | A1 | 5/2005 | Bratek et al. | |
| 2005/0166681 | A1 | 8/2005 | Onoda et al. | |
| 2005/0210992 | A1 | 9/2005 | Tohyama et al. | |
| 2014/0373635 | A1* | 12/2014 | Seeberg | G01L 19/086 |
| | | | | 73/756 |
| 2018/0321104 | A1* | 11/2018 | Petrarca | G01L 9/0051 |

FOREIGN PATENT DOCUMENTS

| | | |
|---|---|---|
| CN | 104316252 A | 1/2015 |
| CN | 104736985 A | 6/2015 |
| CN | 104919294 | 9/2015 |
| DE | 10302281 A1 | 3/2004 |
| JP | 2008-185349 A | 8/2008 |
| KR | 1020130042300 A | 4/2013 |
| KR | 1020150129913 A | 11/2015 |
| RU | 2041453 C1 | 8/1995 |
| RU | 2517798 C1 | 5/2014 |
| WO | 2011041481 A1 | 4/2011 |

OTHER PUBLICATIONS

Abstract of DE 10302281 A1, dated Mar. 4, 2004, 1 page.
Abstract of CN 104919294 A, dated Sep. 16, 2015, 1 page.
Abstract of CN 104316252 A, dated Jan. 28, 2015, 1 page.
Abstract of RU 2517798 C1, dated May 27, 2014, 2 pages.
Abstract of CN 104736985 A, dated Jun. 24, 2015, 1 page.
Extended European Search Report, European Patent Application No. 16882074.4, dated Jul. 25, 2019, 8 pages.
Abstract of CN 203616040 U, dated May 28, 2019, 1 page.
PCT Search Report, dated Mar. 27, 2017, 3 pages.
Abstract of WO2017116122, dated Jul. 6, 2017, 1 page.
Japanese Notice of Reasons for Refusal with English translation, Chinese Patent Application No. 2018-533916, dated Aug. 26, 2020, 8 pages.
Abstract of JP 2008-185349, dated Aug. 14, 2008, 1 page.

* cited by examiner

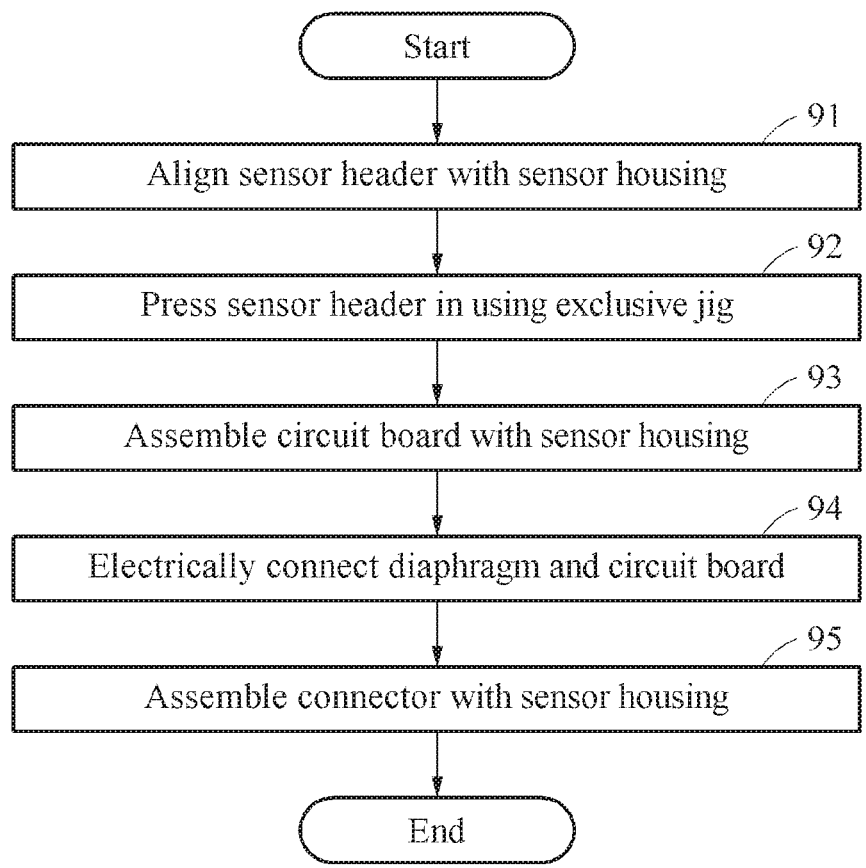

PRESSURE SENSOR AND MANUFACTURING METHOD THEREFOR

CROSS-REFERENCE TO RELATED APPLICATIONS

This application is a continuation of PCT International Application No. PCT/KR2016/015353, filed on Dec. 28, 2016, which claims priority under 35 U.S.C. § 119 to Korean Patent Application No. 10-2015-0188662, filed on Dec. 29, 2015.

FIELD OF THE INVENTION

The present invention relates to a pressure sensor and, more particularly, to a pressure sensor including a sensor header pressed into a sensor housing.

BACKGROUND

A sensor, as is known in the art, senses or detects and measures a physical quantity of heat, light, temperature, pressure, or sound or a change therein. The sensor sends the corresponding information as a signal. A pressure sensor, for example, senses a pressure and transmits pressure information as a predetermined signal. Known pressure sensors, however, are difficult to manufacture.

SUMMARY

A pressure sensor comprises a sensor housing and a sensor header. The sensor housing includes a fastener adapted to be fastened to a pressure measurement target and a housing pathway extending through the fastener and adapted to guide a fluid flowing from the pressure measurement target. The sensor header includes a port pressed in and fixed to the housing pathway, a header pathway extending through the port and adapted to guide the fluid flowing from the housing pathway, and a diaphragm positioned at an end portion of the header pathway.

BRIEF DESCRIPTION OF THE DRAWINGS

The invention will now be described by way of example with reference to the accompanying Figures, of which:

FIG. 6 is a flowchart of a method of manufacturing the pressure sensor.

DETAILED DESCRIPTION OF THE EMBODIMENT(S)

Figure 1:
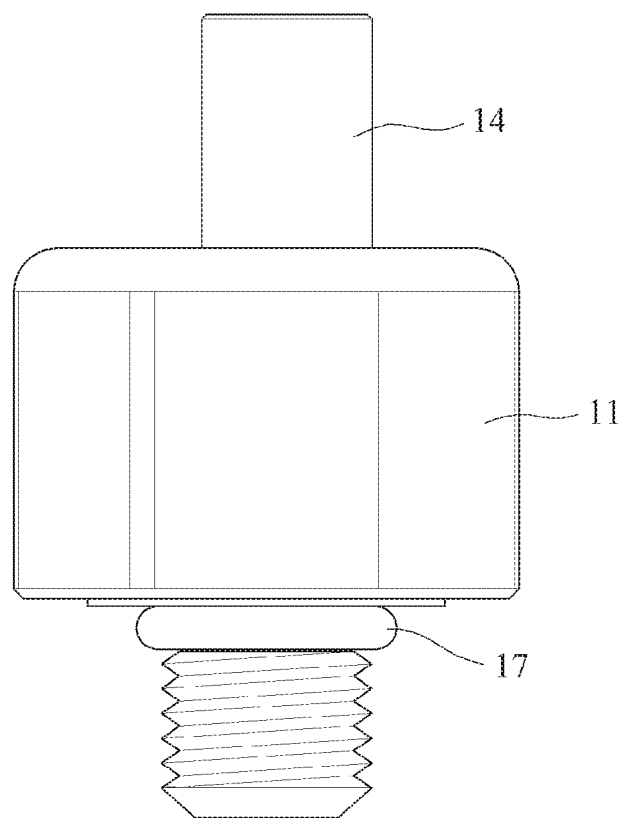
FIG. 1 is a side view of a pressure sensor according to an embodiment.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

Throughout the specification, terms such as first, second, A, B, (a), (b), and the like may be used herein to describe components. Each of these terminologies is not used to define an order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

Figure 2:
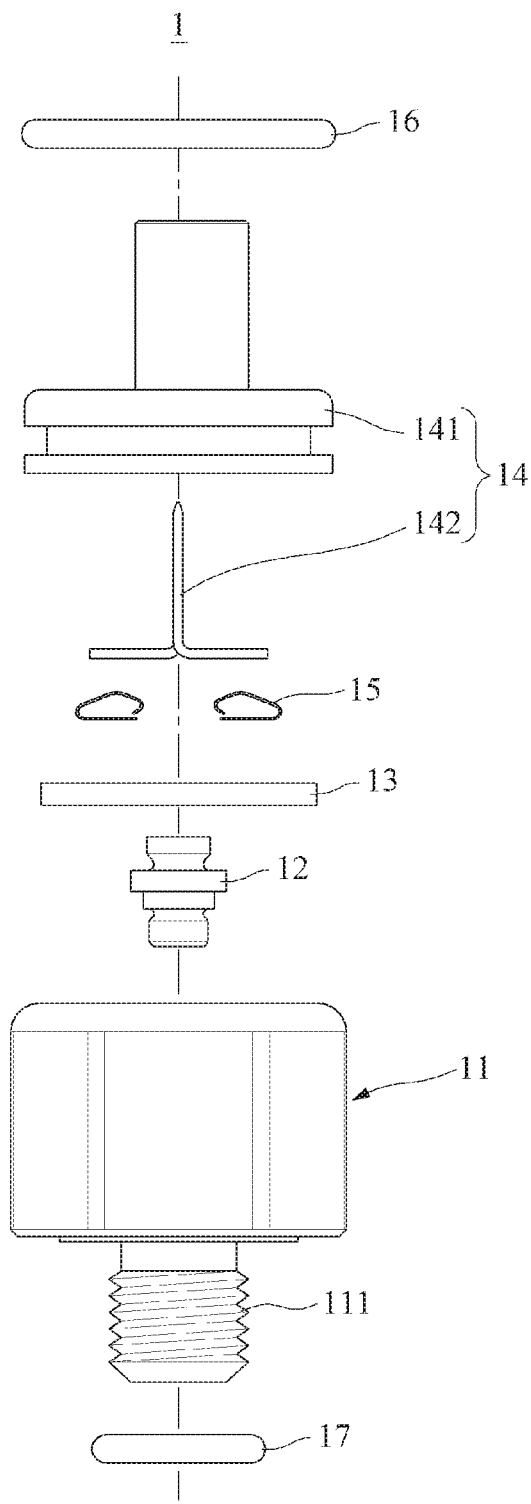
FIG. 2 is an exploded side view of the pressure sensor.

A pressure sensor 1 according to an embodiment, as shown in FIGS. 1 and 2, may be fastened to a pressure measurement target to measure a pressure of a fluid flowing from the pressure measurement target and transmit the measured pressure to an external device. The pressure sensor 1 includes a sensor housing 11, a sensor header 12, a circuit board 13, a connector 14, a connecting terminal 15, an inner O-ring 16, and an outer O-ring 17.

Figure 4:
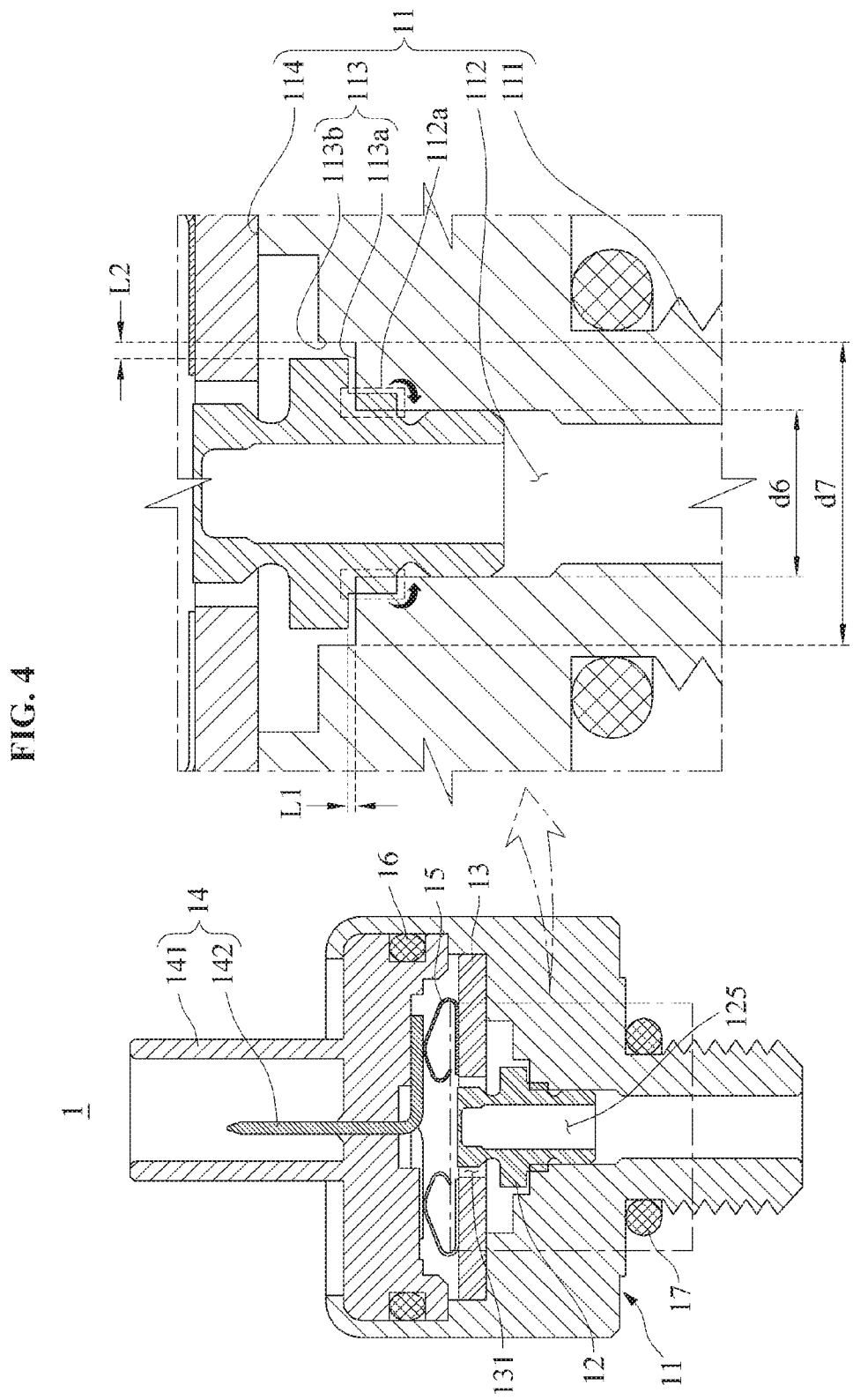
FIG. 4 is a sectional side view of the pressure sensor and an enlarged portion of the sectional side view.

The sensor housing 11, as shown in FIG. 2, includes a fastener 111 to be fastened to the pressure measurement target, and a housing pathway 112 shown in FIG. 4 penetrating the fastener 111 to guide the fluid flowing from the pressure measurement target.

The sensor header 12 may be pressed in and fixed to the housing pathway 112, as shown in FIG. 4. In an embodiment, the sensor housing 11 and the sensor header 12 may be coupled to each other in a press-in manner while being machined to be cut separately. The sensor header 12 is formed of a material having a higher yield stress than a material of the sensor housing 11. A configuration and an assembling process of the sensor header 12 will be described in greater detail below with reference to FIGS. 3 and 4.

The circuit board 13 transmits the measured signal from the sensor header 12 to the external device through the connector 14. The connector 14 transmits the signal received from the circuit board 13 to the external device. The connector 14, as shown in FIG. 2, includes a connector housing 141 to be connected to the sensor housing 11 and a connection terminal 142 to be positioned in the connector housing 141 and electrically connected to the circuit board 13.

The connecting terminal 15, as shown in FIG. 4, is disposed between the circuit board 13 and the connection terminal 142 to electrically connect the circuit board 13 and the connection terminal 142. The connecting terminal 15 has an elasticity in a direction perpendicular to the circuit board 13. As shown in the embodiment of FIG. 2, the connecting terminal 15 has a C-clip shape. By the above structure, even in a case in which there exists a manufacturing tolerance and an assembling tolerance of the circuit board 13 and/or the connection terminal 142, an electrical contact state of the circuit board 13 and the connection terminal 142 may be stably secured.

The inner O-ring 16, as shown in FIG. 4, is disposed between the connector housing 141 and the sensor housing 11 to maintain an airtightness between the connector housing 141 and the sensor housing 11, thereby preventing an inflow of a foreign substance. In the shown embodiment, the inner O-ring 16 is disposed along an outer edge of the connector housing 141 and an inner edge of a portal of the sensor housing 11.

The outer O-ring 17 is disposed in a circumferential direction around the fastener 111 of the connector housing 141, as shown in FIGS. 1 and 4. The outer O-ring 17 may maintain an airtightness between the pressure measurement target and the sensor housing 11, thereby preventing an inflow of a foreign substance.

Figure 3:
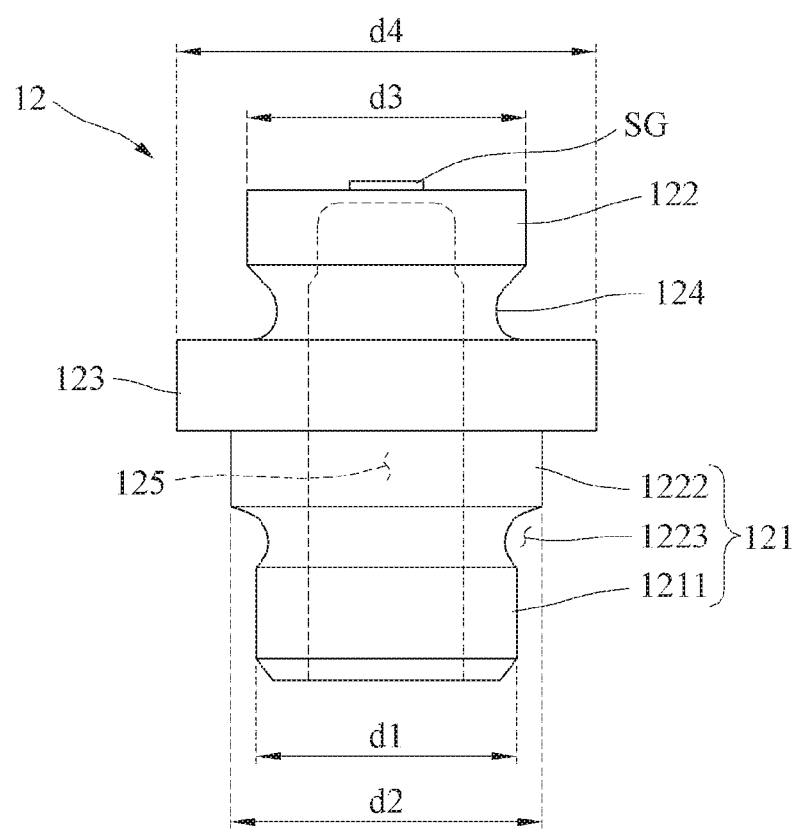
FIG. 3 is a side view of a sensor header of the pressure sensor.

As shown in FIGS. 3 and 4, the sensor header 12 is pressed in and fixed to the sensor housing 11. The sensor header 12 and the sensor housing 11 may be formed of materials having different yield stresses, for example, metals having different yield stresses. In an embodiment, the sensor housing 11 may be formed of an aluminum alloy and the sensor header 12 may be formed of stainless steel having a higher yield stress than the aluminum alloy.

One of the sensor header 12 and the sensor housing 11, the one formed of a material having a lower yield stress, is deformed during a process of pressing the sensor header 12 in the sensor housing 11 by applying a sufficient force thereto. A deformed portion of the sensor header 12 or the sensor housing 11 extends into an empty space of the other of the sensor header 12 and the sensor housing 11 formed of the material having a higher yield stress; the sensor header 12 and the sensor housing 11 are coupled and in close contact in shapes to be airtight without using a separate fastening element. That is, the sensor header 12 is coupled to and sealed with the sensor housing 11 without using a separate airtight device such as an O-ring. A volume may change slightly as the temperature changes and, consequently, a change in the airtightness level with respect to the temperature may be reduced. Further, the total number of parts constituting the pressure sensor 1 may be reduced, whereby the production cost may be reduced, and the manufacturing process may be simplified. In addition, an effect of a miscellaneous load generated during an assembling process on the pressure sensor 1 may be reduced.

The sensor header 12, as shown in FIG. 3, includes a port 121, a diaphragm 122, a flange 123, a connecting neck 124, a header pathway 125, and a strain gauge SG.

As shown in FIG. 3, the header pathway 125 penetrates the port 121. One end of the header pathway 125 fluidly communicates with the housing pathway 112, as shown in FIG. 4, to guide the fluid flowing from the housing pathway 112, and an opposite end of the header pathway 125 is covered by the diaphragm 122. The diaphragm 122 has a shape of a thin plate to be deformed by the fluid flowing thereinto.

The strain gauge SG, as shown in FIG. 3, is attached to one surface, for example, a top surface, of the diaphragm 122. The strain gauge SG converts a deformation level of the diaphragm 122 into an electrical signal and transmit the electrical signal to the circuit board 13. The strain gauge SG may be formed of, for example, a silicon material.

The port 121 is pressed in and fixed to the housing pathway 112 as shown in FIG. 4. In an embodiment, the port 121 is formed of a material having a higher yield stress than the material of the sensor housing 11. The port 121 includes an insert 1211, a press-in part 1222, and a fixing groove 1223 as shown in FIG. 3.

As shown in FIGS. 3 and 4, the insert 1211 is inserted into the housing pathway 112. A diameter d1 of the insert 1211 is less than or equal to a diameter d6 of the housing pathway 112.

The press-in part 1222 is positioned behind the insert 1211 based on a direction in which the port 121 is inserted into the housing pathway 112. The press-in part 1222 is pressed in the housing pathway 112. A diameter d2 of the press-in part 1222 is greater than the diameter d1 of the insert 1211 and greater than the diameter d6 of the housing pathway 112. Further, a yield stress of a material of the press-in part 1222 is higher than a yield stress of a material of an inner end portion of the housing pathway 112. The inner end portion of the housing pathway 112 is deformed while the press-in part 1222 is being pressed in the housing pathway 112. A portion deformed, at the inner end portion of the housing pathway 112, is a deformed portion 112a.

The fixing groove 1223 is recessed between the insert 1211 and the press-in part 1222 as shown in FIG. 3. A minimum diameter of the fixing groove 1223 is less than the diameter d6 of the housing pathway 112. The deformed portion 112a of the housing pathway 112 fills the fixing groove 1223 while the press-in part 1222 is being pressed in the housing pathway 112, thereby preventing a separation of the port 121 from the housing pathway 112.

The flange 123, as shown in FIG. 3, is positioned between the port 121 and the diaphragm 122, and has a diameter d4 greater than the maximum diameter d2 of the port 121 and a maximum diameter d3 of the diaphragm 122. In a plane perpendicular to a longitudinal direction of the housing pathway 112 and/or the header pathway 125, a cross-sectional area of the flange 123 excluding the header pathway 125 is greater than a maximum cross-sectional area of the port 121 excluding the header pathway 125. In an embodiment, the cross-sectional area of the flange 123 excluding the header pathway 125 may be at least two times greater than the maximum cross-sectional area of the port 121 excluding the header pathway 125. For a mechanical stress generated in a vicinity of the press-in part 1222 when the press-in part 1222 is completely pressed in the housing pathway 112, the flange 123 having a relatively great cross-sectional area and volume disperses the mechanical stress, reducing an effect of the mechanical stress on an output of the pressure sensor 1.

The connecting neck 124 is disposed between the flange 123 and the diaphragm 122 and, as shown in FIG. 3, has a diameter less than the diameter d3 of the diaphragm 122 and the maximum diameter d2 of the port 121. Although a portion of the mechanical stress is dispersed while passing through the flange 123, the mechanical stress may be completely dispersed while deforming the connecting neck 124 before being transmitted to the diaphragm 122. Hence, a miscellaneous load to be transmitted to the diaphragm 122 is blocked.

The sensor housing 11, as shown in FIG. 4, includes a receiver 113 having a diameter d7 greater than the diameter d6 of the housing pathway 112. The receiver 113 receives the flange 123. The sensor housing 11 has a seat portion 114 positioned above the receiver 113, the seat portion 114 having a greater diameter than the receiver 113. The seat portion 114 provides a space in which the circuit board 13 is seated. The receiver 113 includes a bottom surface 113a connected to the housing pathway 112 and an inner circumferential surface 113b to enclose a circumference of the bottom surface 113a.

When the sensor header 12 is completely fastened to the sensor housing 11 as shown in FIG. 4, the flange 123 is spaced apart by a distance L1 from the bottom surface 113a of the receiver 113. In an embodiment, the distance L1 is 0.5 millimeters (mm). Although the sensor header 12 and the sensor housing 11 formed of different materials expand by heat with different degrees in response to a change in the peripheral temperature, interference of the flange 123 with the bottom surface 113a of the receiver 113 may be prevented. Hence, by the above structure, transmission of an undesired mechanical stress to the diaphragm 122 due to a volume change caused by the change in the peripheral temperature of the pressure sensor 1 is prevented, improving a measuring accuracy of the pressure sensor 1.

The diameter d7 of the receiver 113 is a distance L2 greater than the diameter of the flange 123. When the sensor header 12 is completely fastened to the sensor housing 11 as shown in FIG. 4, the flange 123 is spaced apart by the distance L2 from the inner circumferential surface 113b of the receiver 113. In an embodiment, the distance L2 is 1 mm. By the above structure, although the sensor header 12 and the sensor housing 11 formed of different materials expand by heat with different degrees in response to a change in the peripheral temperature, interference of the flange 123 with the inner circumferential surface 113b of the receiver 113 may be prevented. Hence, by the above structure, transmission of an undesired mechanical stress to the diaphragm 122 due to a volume change caused by the change in the peripheral temperature of the pressure sensor 1 is prevented, improving the measuring accuracy of the pressure sensor 1.

The circuit board 13 is seated in the seat portion 114 of the sensor housing 11, as shown in FIG. 4. The circuit board 13 has a sensor hole 131 formed to have a diameter greater than the diameter of the diaphragm 122. When the circuit board 13 is seated in the seat portion 114, the diaphragm 122 is positioned at a center of the sensor hole 131. By the above structure, the strain gauge SG and the circuit board 13 are electrically connected easily, while the sensor header 12 and the circuit board 13 are sequentially assembled with the sensor housing 11. In an embodiment, the strain gauge SG and the circuit board 13 are connected to each other by wire bonding.

Figure 5:
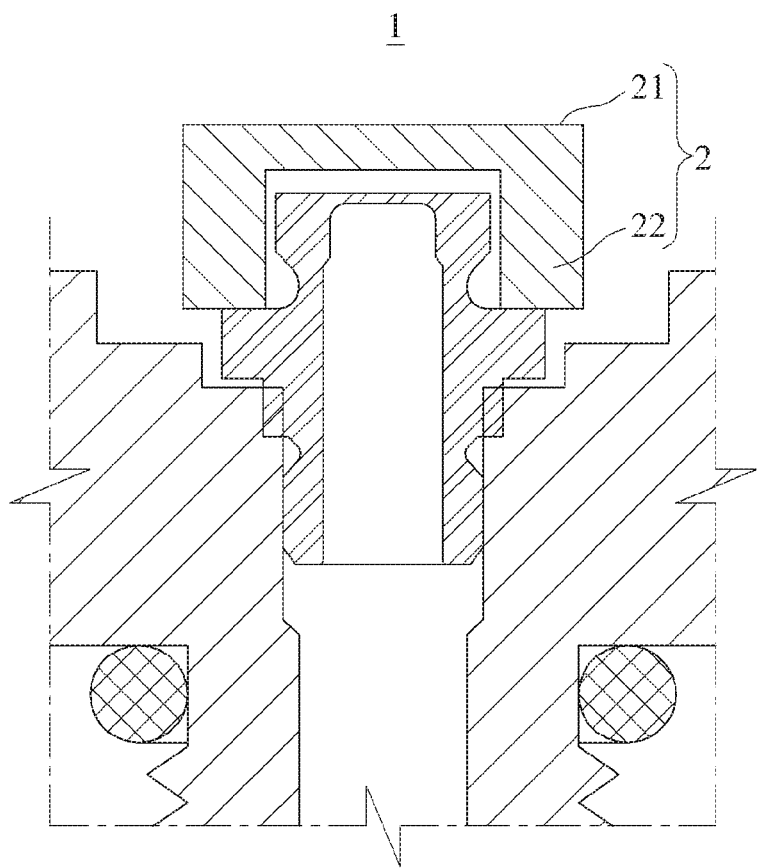
FIG. 5 is a sectional side view of a process of pressing the sensor header into a sensor housing of the pressure sensor using a jig.

A process of pressing the sensor header 12 in the sensor housing 11 using a jig 2 according to an embodiment is shown in FIG. 5.

The jig 2, as shown in FIG. 5, applies pressure to the flange 123 without applying pressure to the diaphragm 122 of the sensor header 12. The jig 2 includes a pressurizing plate 21 and a pressurizing protrusion 22. The pressurizing plate 21 is spaced apart from the diaphragm 122 when the jig 2 is in contact with the flange 123. In an embodiment, the pressurizing plate 21 has a flat top surface such that a pressurizing device to pressurize the jig 2 provides a uniform pressure to the jig 2.

The pressurizing protrusion 22 protrudes from the pressurizing plate 21 and has a protruding length greater than a distance from a top surface of the flange 123 to a top surface of the diaphragm 122 in the embodiment of FIG. 5. The pressurizing protrusion 22 has a symmetric shape about a center of the pressurizing plate 21, for example, a hollow cylindrical shape. The shape of the pressurizing protrusion 22 is not limited to the cylindrical shape. In other embodiments, the pressurizing protrusion 22 may have a shape of a plurality of columns disposed along an edge of the pressurizing plate 21. A distance from the center of the pressurizing plate 21 to an inner wall of the pressurizing protrusion 22 may be greater than a distance from the center of the diaphragm 122 to an edge of the diaphragm 122. By the above shape, interference of the jig 2 with the diaphragm 122 while the jig 2 is pressurizing the flange 123 is prevented and transmission of a mechanical stress to the diaphragm 122 is prevented.

A method of manufacturing the pressure sensor 1 is shown in FIG. 6. The method includes a first operation 91 of aligning the sensor header 12 with the sensor housing 11, a second operation 92 of pressing the sensor header 12 in using the jig 2, a third operation 93 of assembling the circuit board 13 with the sensor housing 11, a fourth operation 94 of electrically connecting the diaphragm 122 and the circuit board 13, and a fifth operation 95 of assembling the connector 14 with the sensor housing 11.

First, in the first operation 91, the port 121 of the sensor header 12 is aligned with the housing pathway 112 of the sensor housing 11. The insert 1211 and the fixing groove 1223 each having the diameter less than or equal to the diameter of the housing pathway 112, among the port 121 of the sensor header 12, are inserted into the housing pathway 112, and the press-in part 1222 having the diameter greater than the diameter of the housing pathway 112 is aligned while being stopped by the housing pathway 112.

Next, in the second operation 92, the port 121 is pressed in the housing pathway 112 by applying pressure to the flange 123 of the sensor header 12. In an embodiment, a worker may apply pressure to the flange 123 using the jig 2 shown in FIG. 5. The worker applies pressure to the jig 2 using a pressurizing device capable of position control and/or load sensing, for example, a servo press. By the above method, the worker may control the flange 123 to be stopped at a position spaced apart from the bottom surface 113a of the receiver 113 based on a predetermined value. Further, the worker may easily perform quality control based on a load pattern during pressurization and a pressurizing depth of the sensor header 12.

Next, in the third operation 93, the circuit board 13 is seated in the sensor housing 11. The circuit board 13 transmits a signal measured from the strain gauge SG disposed on the diaphragm 122 of the sensor header 12 to an external device. While the circuit board 13 is seated in the sensor housing 11, the circuit board 13 and the strain gauge SG are connected to each other by wire bonding.

After the wire bonding of the circuit board 13 and the strain gauge SG, the connector 14 including the connection terminal 142 to be electrically connected to the circuit board 13 is assembled with the sensor housing 11 in the fourth operation 94. After the third operation 93 and before the fourth operation 94, the connecting terminal 15 is installed on the circuit board 13. The connecting terminal 15 electrically connects the connection terminal 142 and the circuit board 13.

What is claimed is:

1. A pressure sensor, comprising:
    a sensor housing including a fastener adapted to be fastened to a pressure measurement target and a housing pathway extending through the fastener and adapted to guide a fluid flowing from the pressure measurement target; and
    a sensor header including a port pressed in and fixed to the housing pathway, a header pathway extending through the port and adapted to guide the fluid flowing from the housing pathway, a diaphragm positioned at an end portion of the header pathway, a flange positioned between the port and the diaphragm, and a connecting neck disposed between the flange and the diaphragm, the connecting neck having a diameter less than a maximum diameter of the diaphragm and less than a maximum diameter of the port.

2. The pressure sensor of claim 1, wherein the port is formed of a material having a higher yield stress than a material of the sensor housing.

3. The pressure sensor of claim 2, wherein the port includes:
    an insert adapted to be inserted into the housing pathway;
    a press-in part positioned behind the insert in a direction in which the port is inserted into the housing pathway, the press-in part having a diameter greater than a diameter of the housing pathway; and a fixing groove recessed between the insert and the press-in part, the fixing groove having a minimum diameter less than the diameter of the housing pathway, the fixing groove configured to prevent a separation of the port from the housing pathway by receiving a deformed portion of an inner end portion of the housing pathway while the press-in part is being pressed in the housing pathway.

4. The pressure sensor of claim 1, wherein the flange has a diameter greater than a diameter of the port and greater than a diameter of the diaphragm.

5. The pressure sensor of claim 4, wherein a cross-sectional area of the flange is greater than a maximum cross-sectional area of the port in a plane perpendicular to a longitudinal direction of the housing pathway.

6. The pressure sensor of claim 4, wherein the sensor housing includes a receiver having a diameter greater than the diameter of the housing pathway, the receiver configured to receive the flange.

7. The pressure sensor of claim 6, wherein the diameter of the receiver is greater than the diameter of the flange.

8. The pressure sensor of claim 6, wherein the flange is spaced apart from a bottom surface of the receiver when the sensor header is completely fastened to the sensor housing.

9. The pressure sensor of claim 1, further comprising a circuit board including a sensor hole formed to have a diameter greater than a diameter of the diaphragm.

10. The pressure sensor of claim 9, wherein the diaphragm is positioned at a center of the sensor hole and a strain gauge attached to the diaphragm is electrically connected to the circuit board.

11. The pressure sensor of claim 10, further comprising a connector configured to transmit a signal received from the circuit board to an external device, the connector includes a connector housing connected to the sensor housing and a connection terminal positioned in the connector housing and electrically connected to the circuit board.

12. The pressure sensor of claim 11, further comprising a connecting terminal having an elasticity in a direction perpendicular to the circuit board, the connecting terminal electrically connecting the circuit board and the connection terminal.

13. A pressure sensor, comprising:
a sensor housing including a fastener adapted to be fastened to a pressure measurement target and a housing pathway extending through the fastener and adapted to guide a fluid flowing from the pressure measurement target;
a sensor header including a port pressed in and fixed to the housing pathway, a header pathway extending through the port and adapted to guide the fluid flowing from the housing pathway, and a diaphragm positioned at an end portion of the header pathway;
a circuit board including a sensor hole formed to have a diameter greater than a diameter of the diaphragm, the diaphragm is positioned at a center of the sensor hole and a strain gauge attached to the diaphragm is electrically connected to the circuit board;
a connector configured to transmit a signal received from the circuit board to an external device, the connector includes a connector housing connected to the sensor housing and a connection terminal positioned in the connector housing and electrically connected to the circuit board; and
a connecting terminal having an elasticity in a direction perpendicular to the circuit board, the connecting terminal electrically connecting the circuit board and the connection terminal.

* * * * *